UNITED STATES PATENT OFFICE.

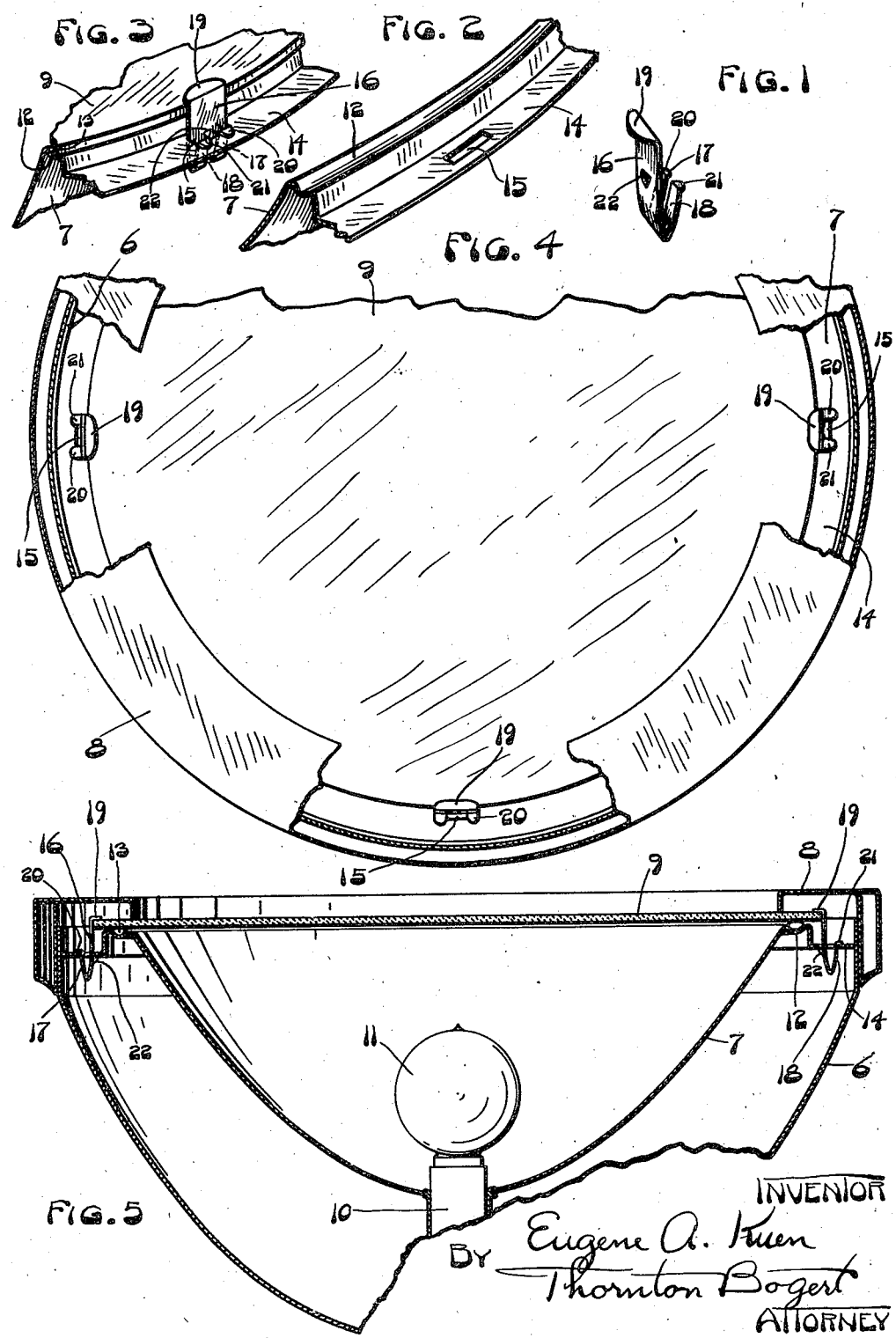
E. A. KUEN.
GLASS FASTENING FOR AUTOMOBILE LAMPS.
APPLICATION FILED AUG. 8, 1921.
1,414,088. Patented Apr. 25, 1922.

EUGENE A. KUEN, OF CINCINNATI, OHIO, ASSIGNOR TO THE THOS. J. CORCORAN LAMP CO., OF CINCINNATI, OHIO, A CORPORATION OF OHIO.

GLASS FASTENING FOR AUTOMOBILE LAMPS.

1,414,088.            Specification of Letters Patent.      Patented Apr. 25, 1922.

Application filed August 8, 1921. Serial No. 490,589.

*To all whom it may concern:*

Be it known that I, EUGENE A. KUEN, a citizen of the United States, residing at Cincinnati, in the county of Hamilton and State of Ohio, have invented a new and useful Glass Fastening for Automobile Lamps, of which the following is a specification.

The invention relates to a fastening device for the closure lens or glass of automobile lamps and particularly to the class of automobile lamp design in which the glass is held directly against the packing or cushioning ring of automobile lamp reflectors by separate instrumentalities other than the door rim.

An object of my invention is to produce a glass fastening device which is capable of cheaper and simpler manufacturing operations than other fastening clips known to me, which results in less manipulation to the parts of the lamp in order to provide for its installation and which while being much more easily assembled with the other parts of the lamp, will when in operative position relatively to the glass portion of the lamp closure, be less liable to become displaced during assembly and during use.

These and other objects are attained in the device described in the following specification and illustrated in the accompanying drawing in which:

Fig. 1 is a perspective view of a glass retaining clip embodying my invention.

Fig. 2 is a fragmental perspective view of the rim and outwardly projecting flange of a lamp reflector arranged for the installation of one of my improved clips thereon.

Fig. 3 is a fragmental perspective view of a portion of a lamp reflector having a door glass, which is also shown fragmentally, held in position by one of my improved clips.

Fig. 4 is a fragmental front elevation of a lamp having parts broken away to show glass clips embodying my invention, in position, the lamp being shown upon a reduced scale.

Fig. 5 is a transverse sectional view of the lamp shown in Fig. 4 showing the clip embodying my invention, in position.

In illustrating the embodiment of my invention I have chosen the conventional type of automobile head lamp having a body 6 in which a reflector 7 is located, which is closed by a closure consisting of a rim 8 and a glass 9. The usual connector 10 and lamp bulb 11 are shown. The reflector is provided with a grooved periphery 12 in which the usual packing or cushion cord 13 is located for support of the glass. Beyond the groove 12 an outwardly projecting rim 14 extends, and in this rim the required number of elongated slots 15 are provided for the reception of my improved clip. The clip, which is illustrated separately in Fig. 1, consists of a substantially U or V shaped member of suitable spring metal, having an elongated branch 16 and a shorter bifurcated branch consisting of two spring fingers 17 and 18. The upper end of the elongated branch is turned outwardly to form a lip 19 which lies snugly against the outer surface of the closure glass 9 adjacent to its edge, and the upper end of the fingers are turned outwardly to form lips 20 and 21 which engage the rim 14 snugly outside the slot 15, as shown in Figs. 3 and 5. In the longer branch 16 a stabbed lug 22 is provided to cooperate with the lips 20 and 21 in retaining the clip in the reflector as will be explained.

The clip embodying my invention is installed during the assembly of the lamp parts after the body and reflector are duly secured together. The operation is simple in that it consists merely in pushing the bottom of the clip through its slot 15 until lips 20 and 21 engage the upper or outer surface of rim 14 and until lug 22 engages the inner or under surface thereof as shown in Figs. 3, 4 and 5. The closure glass 9 is then placed against the packing 13 by flexing the upper ends of branches 16 of the clips until lips 19 clear the edges of the glass. By pressing the glass snugly against packing 13 the clip branches will snap into glass holding position with the lips 19 extending over the outer surface of the glass as shown in Figs. 3, 4 and 5. The closure rim may now be placed in position relatively to the body and into engagement with the glass, the entire lamp having thus been assembled and the glass held snugly irrespective of the fastening of the closure rim. My invention particularly adapts itself to certain new types of closure glass formations in which cast prismatic and other figures are provided in the glass to deflect the light rays toward the road surface, in that such lenslike glass closures have to be located in upright positions and hence have notches in them for engagement with such clips as I disclose, which prevent their rotation relatively to the vertical position of the lamp, the door or closure rim in using such lens being separate from the lens as to its mounting with relation to the rest of the lamp.

Another feature of my improved clip is that it eliminates the necessity of having to slit the reflector rim from its edge inwardly as in certain present constructions. This has several advantages among which is that of leaving a smooth and unnotched rim on the reflector which is easier to handle because it does not snag the hands and catch upon the other lamp parts in assembling. Another advantage is that the clip is held positively against radial displacement caused by vibration and otherwise. A manufacturing advantage lies in being able to produce the clip and perforate the reflector rim with the simplest of tools and dies without having to provide for ears and lugs which stand in different planes for straddling such edgewise reflector notches.

Having thus described my invention what I claim is:

1. A closure glass retaining clip for automobile lamps, in combination with a reflector having a slotted rim and a closure glass therefor, consisting of a substantially U shaped spring member having one branch longer than the other, the shorter branch being bifurcated, a glass-engaging lip on the longer branch, reflector-engaging lips on the bifurcations of the shorter branch, and a lug on the longer branch adapted to engage the rear face of the reflector rim when the clip is placed in the clip-receiving slot thereof, whereby the reflector-engaging lips will be held against the front face of the reflector rim when the longer branch is flexed to bring its lip into engagement with the closure glass.

2. In combination in an automobile lamp, a body, a reflector having an outwardly projecting perforated rim, adapted to occupy the body, a closure glass upon the reflector, and a substantially U shaped clip located in the rim perforation, said clip having rim and glass-engaging lips on the branches thereof adapted to retain the glass upon the reflector when it is flexed to bring its lips into engagement with the surface of the glass.

3. In an automobile lamp the combination of a body, a reflector having a perforated rim, adapted to occupy the body, a closure glass upon the reflector, and a substantially U shaped clip located in the rim perforation, said clip having rim and glass-engaging lips on the branches thereof adapted to retain the glass upon the reflector when it is flexed to bring its lips into engagement with the surface of the glass, and a lug on the clip adapted to retain the clip in position on the reflector.

EUGENE A. KUEN.